United States Patent
Hillman et al.

(10) Patent No.: US 10,562,063 B2
(45) Date of Patent: Feb. 18, 2020

(54) TIRE BEAD LUBRICATING SYSTEM

(71) Applicant: AKRON SPECIAL MACHINERY, INC., Akron, OH (US)

(72) Inventors: Benjamin E. Hillman, Canton, OH (US); Brian D. Mitchell, Akron, OH (US)

(73) Assignee: AKRON SPECIAL MACHINERY, INC., Akron, OH (US)

( * ) Notice: Subject to any disclaimer, the term of this patent is extended or adjusted under 35 U.S.C. 154(b) by 0 days.

(21) Appl. No.: 15/909,175

(22) Filed: Mar. 1, 2018

(65) Prior Publication Data

US 2019/0270112 A1  Sep. 5, 2019

(51) Int. Cl.

| | |
|---|---|
| B05C 11/105 | (2006.01) |
| B05C 1/02 | (2006.01) |
| B05C 7/00 | (2006.01) |
| B60C 25/00 | (2006.01) |
| B05C 11/10 | (2006.01) |
| F16N 7/34 | (2006.01) |
| F16N 7/12 | (2006.01) |
| F16N 7/14 | (2006.01) |
| B29D 30/26 | (2006.01) |

(52) U.S. Cl.
CPC ............ *B05C 11/105* (2013.01); *B05C 1/027* (2013.01); *B05C 7/005* (2013.01); *B05C 11/1002* (2013.01); *B05C 11/1039* (2013.01); *B29D 30/26* (2013.01); *B60C 25/00* (2013.01); *F16N 7/12* (2013.01); *F16N 7/14* (2013.01); *F16N 7/34* (2013.01)

(58) Field of Classification Search
CPC .............. B05C 11/105; B05C 11/1002; B05C 11/1039; B05C 7/005; B05C 1/027; B05C 7/06; B05C 7/08; B60C 25/00; B60C 25/0596; B60C 25/132; B08B 1/00; B08B 1/02; B08B 1/008; G01M 17/022; F16N 7/12; F16N 7/14; F16N 7/34; F16N 99/00; B29D 30/26
USPC .................. 118/254, 268, 304; 184/101, 102
See application file for complete search history.

(56) References Cited

U.S. PATENT DOCUMENTS

| | | | |
|---|---|---|---|
| 5,876,501 A * | 3/1999 | Doan ...................... | B05C 1/027 118/244 |
| 6,520,294 B2 | 2/2003 | Delmoro et al. ............... | 184/20 |
| 7,597,759 B1 * | 10/2009 | Delmoro ............... | B60C 25/132 118/214 |
| 2015/0209816 A1 * | 7/2015 | Tanaka .................... | B05C 1/027 118/255 |

* cited by examiner

*Primary Examiner* — Laura Edwards
(74) *Attorney, Agent, or Firm* — Renner Kenner Greive Bobak Taylor & Weber

(57) ABSTRACT

A tire bead lubricating system for applying lubricant to a tire consists of a frame supporting conveyor belts which form a conveyor opening therebetween. The conveyor belts transfer a tire from one end of the frame to another. A lubricating wick chamber is maintained within the frame and positioned underneath the conveyor opening. A lubricating wick assembly is received in the lubricating wick chamber and moves into the conveyor opening. The lubricating wick assembly has at least one engagement roller and at least one elongate brush that carries lubricant applied to the tire.

14 Claims, 9 Drawing Sheets

TIRE BEAD LUBRICATING SYSTEM

TECHNICAL FIELD

This invention generally relates to a system for lubricating the bead area of a pneumatic tire.

BACKGROUND OF THE INVENTION

In many operations involving the manufacture of pneumatic tires, following fabrication and vulcanization, a tire is placed on a chuck assembly so that various inspection and grinding operations can be performed. Generally, for example, in a tire uniformity machine, tires are advanced along a conveyor into the uniformity machine whereupon a first chuck is raised to engage a lower bead of the tire following which the tire is elevated so that an upper bead is engaged by a second chuck. The tire is then inflated and various inspections are conducted. The tire is then deflated, the first chuck is retracted, the tire is removed from the second chuck and then removed from the machine so that another tire may be tested.

In such a system and in other areas where tires are mounted on chucks for further manufacturing, inspection, or grinding operations, it is desirable to lubricate the upper and lower beads along their sealing surface so as to achieve a complete airtight seal with the mating surfaces of the chuck or, for that matter, the wheel of an automobile.

One existing lubricating system provides a vertically-oriented roller, sometimes referred to as an applicator, that is mounted beneath a conveyor and housed in a container used to contain overspray or runoff of excess lubricant. As a tire moves into a position above the roller, the roller is extended upward along its axis to enter a bore defined by the tire. At the same time, a pop-up roller table raises the tire from the conveyor. The tire is both driven on the roller table, causing it to contact the roller, and rotated about the roller which applies lubricant to the beads by a set of pop-up spinner rolls. Since contact between the roller and the beads relies on the pop-up spinner rolls driving the tire into contact with the applicator, the roller is stressed by the impact with the tire. Oftentimes, the tire will impact the roller multiple times until achieving the proper position. Accordingly, some systems provide for an applicator assembly having plural applicators movable along the vertical axis to enter the bore of the tire and extensible in a radial direction to contact the beads of the tire and apply a lubricant thereto.

In another known lubricating system; however, it is common to employ a cloth sleeve or "sock" to cover the roller and absorb the lubricating fluid prior to application to the tire bead. In particular, most systems employ a nylon cylindrical roller with the cloth sleeve. Lubricating oil is sprayed on to or otherwise applied to the sleeve prior to each application to the tire bead. The cylindrical roller is then forced into engagement with the bead and then rotated to coat the bead surface. Over time, the tire beads engage the sleeve at a same location and the sleeve tears and no longer adequately applies lubricating material. As such, the sleeve needs to be replaced resulting in downtime of the machine. Skilled artisans will also appreciate that use of a cloth sleeve is problematic as the cloth fibers become loose and get into the hydraulic fluid valves and fluid lines, further causing problems for operation of the tire uniformity machine and other nearby equipment. Therefore, there is a need in the art to use an applicator without a cloth sleeve and which lasts longer and minimizes the need for machine maintenance.

SUMMARY OF THE INVENTION

In light of the foregoing, it is a first aspect of the present invention to provide a tire bead lubricating system.

It is another aspect of the present invention to provide a tire bead lubricating system for applying lubricant to a tire, comprising a lubricating wick assembly axially movable into a bore of the tire, the lubricating wick assembly having opposed caps connected to one another by at least one engagement roller and wherein at least one elongate brush extends from at least one of the caps, wherein the at least one engagement roller contacts a bead of the tire and the at least one elongate brush carries the lubricant to apply to the bead.

Yet another aspect of the present invention is to provide a tire bead lubricating system for applying lubricant to a tire, comprising a frame supporting conveyor belts which form a conveyor opening therebetween, wherein the conveyor belts transfer a tire from one end of the frame to another, a lubricating wick chamber maintained within the frame and positioned underneath the conveyor opening, and a lubricating wick assembly received in the lubricating wick chamber and movable into the conveyor opening, the lubricating wick assembly having at least one engagement roller and at least one elongate brush that carries lubricant applied to the tire.

BRIEF DESCRIPTION OF THE DRAWINGS

These and other features and advantages of the present invention will become better understood with regard to the following description, appended claims, and accompanying drawings wherein:

BEST MODE FOR CARRYING OUT THE INVENTION

Figure 1:
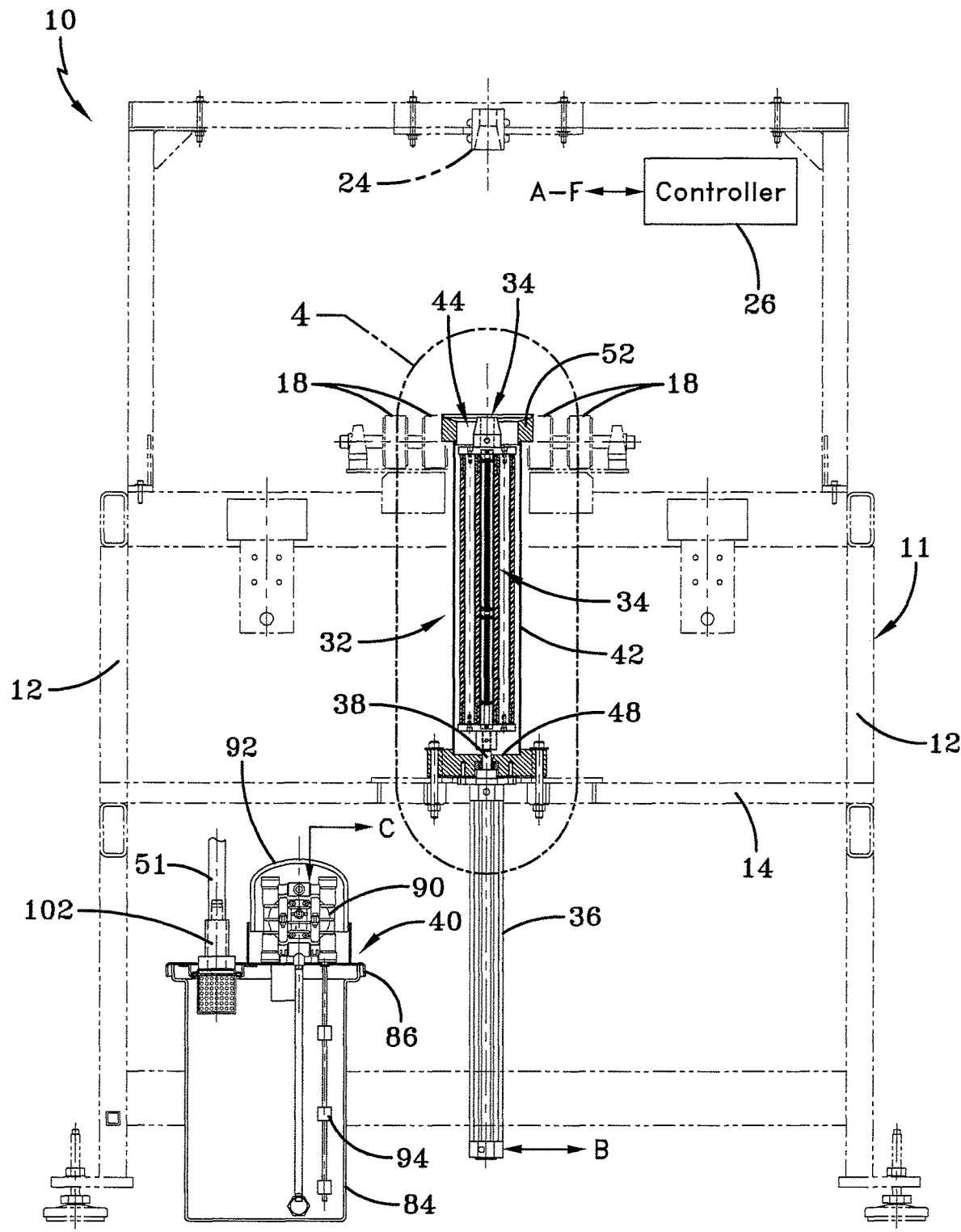
FIG. 1 is a front elevational view of a tire bead lubricating system according to the concepts of the present invention.
Figure 2:
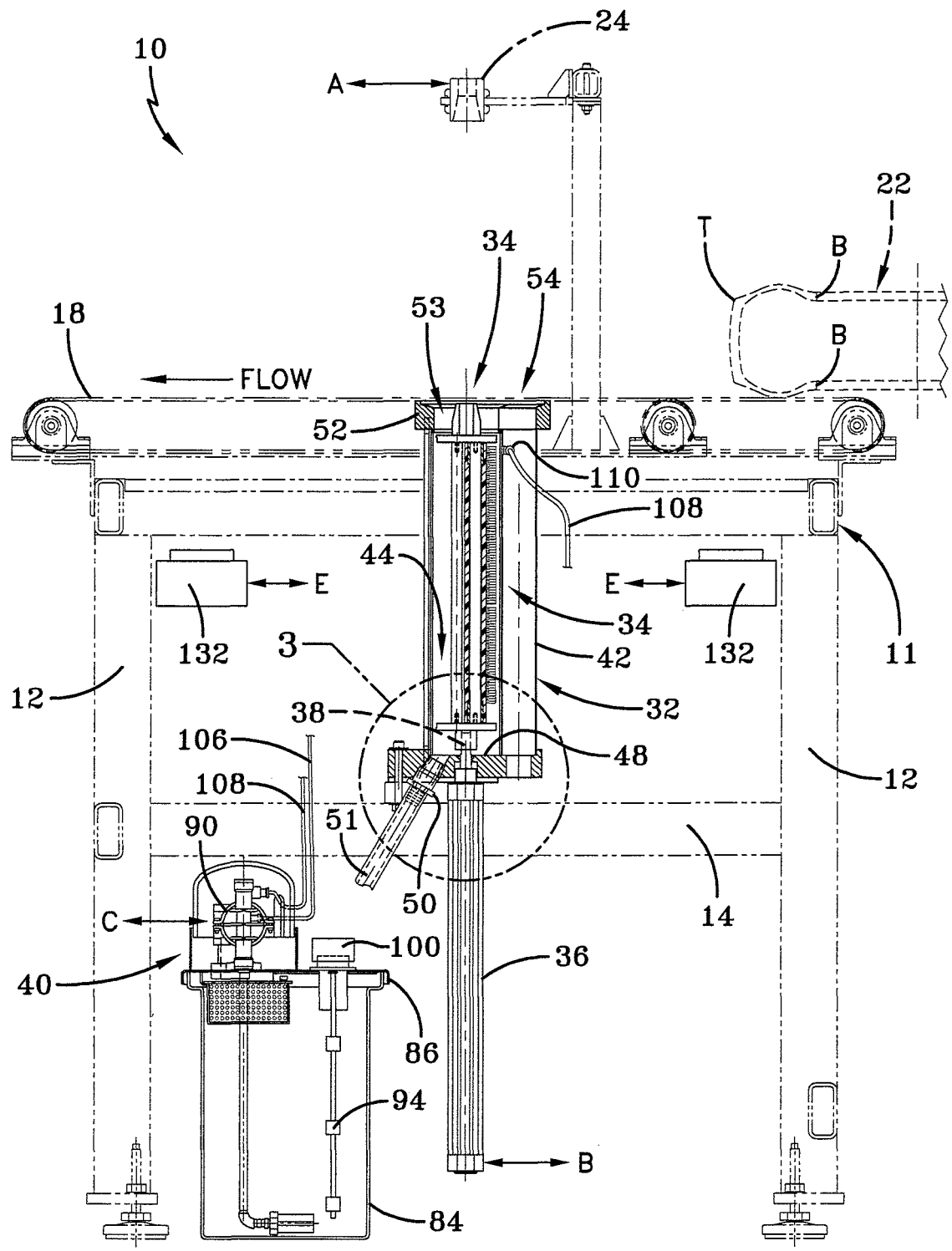
FIG. 2 is a side elevational view of the tire bead lubricating system according to the concepts of the present invention.
Figure 3:
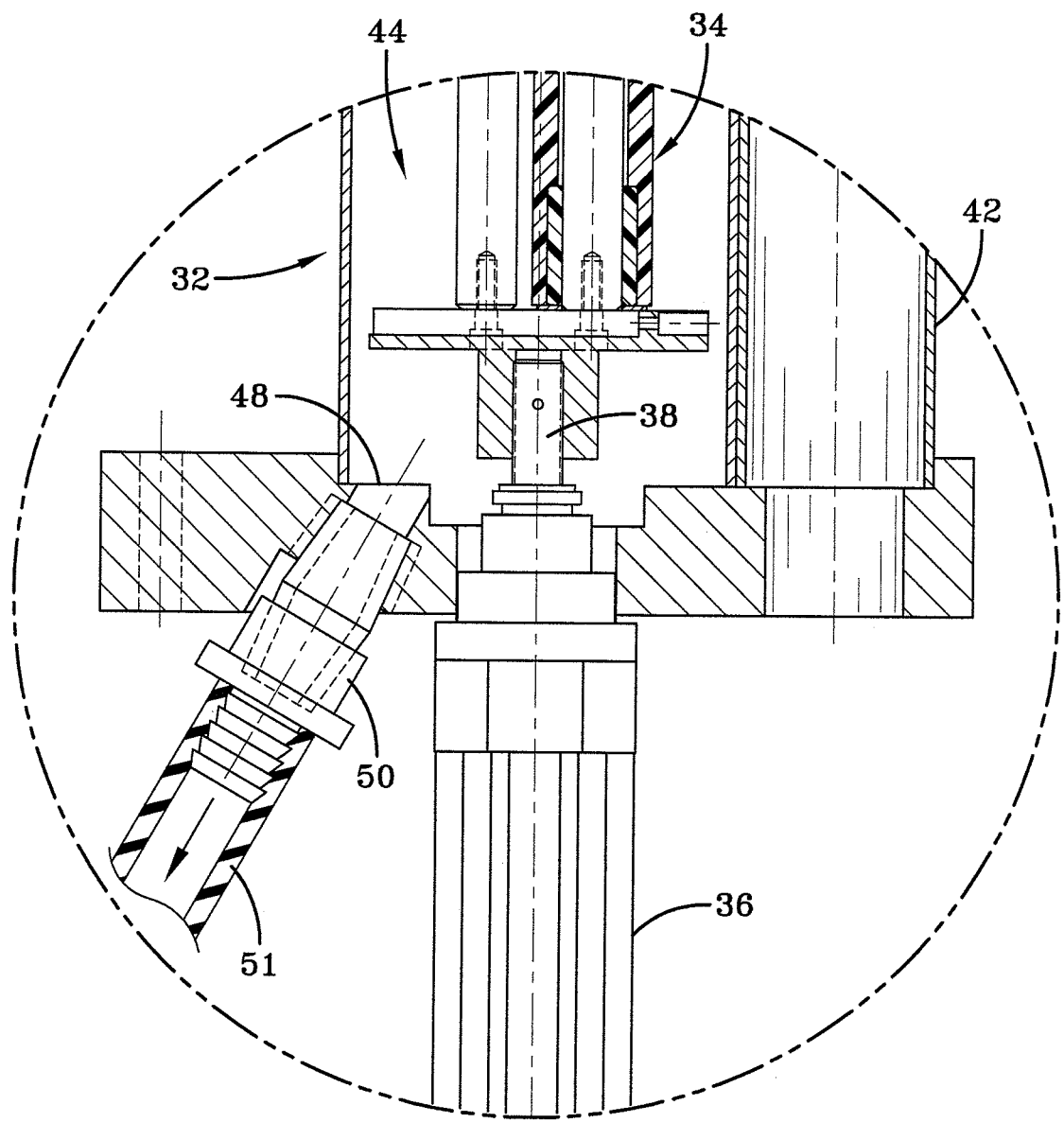
FIG. 3 is a detailed view of a lubricating system utilized in the tire bead lubricating system according to the concepts of the present invention.
Figure 4:
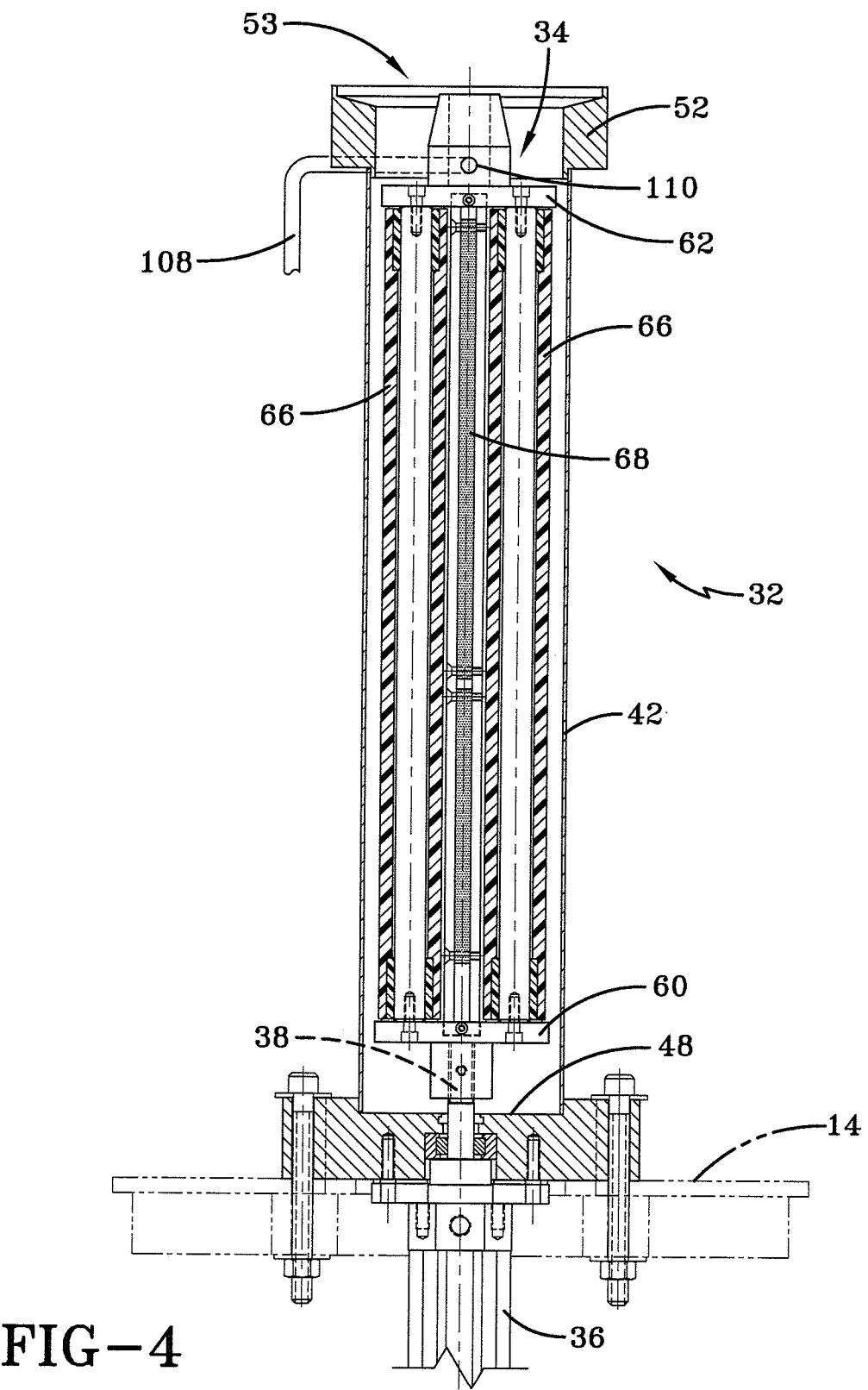
FIG. 4 is a partial cross-sectional view of a lubricating wick chamber which maintains a lubricating wick assembly according to the concepts of the present invention.

As shown in the drawings and in FIGS. 1-3, it can be seen that a tire bead lubricating system is designated generally by the numeral 10. The system 10 is used in conjunction with tire manufacturing and, in particular, tire testing equipment. In particular, the tire bead lubricating system 10 is used prior to the recently manufactured tire being received by a tire uniformity machine, other inspection equipment, or other manufacturing equipment wherein the tire must be received and chucked between a pair of opposed rims prior to the next manufacturing or testing operation. Generally, the tire bead lubricating system applies a lubricating oil to the tire beads so as to facilitate the mounting and dismounting of the tire in the opposed rims of a chucking apparatus.

The system 10 includes a frame designated by the numeral 11 which includes a plurality of posts 12 supported by a manufacturing floor. At about a midpoint of the posts 12, an internal cross member 14 may span from one side to another. Skilled artisans will appreciate that a pair of opposed conveyor belts 18 are associated with the frame 11, wherein the conveyor belts have a conveyor opening 20 (see FIGS. 8 and 9) therebetween. Skilled artisans will appreciate that the conveyor belts 18 are driven by a motor so as to transfer a tire from a prior manufacturing station toward the next, which may be a tire inspection machine. The tire, which is designated by capital letter T, moves on the conveyor belt wherein the tire has opposed beads designated by capital letter B that terminate at each sidewall. The beads define an inner diameter and, in particular, a tire bore 22. The beads are where lubricating fluid is applied so as to facilitate chucking of the tire in the next manufacturing station.

A tire position sensor 24 monitors a leading edge of the tire and generates a position signal A. The position signal A is received by a controller 26 which includes the necessary hardware and software for receiving various types of signals so as to implement various operations of the tire bead lubricating system 10. Once an appropriate position signal A is received by the controller 26, the controller instructs the motors connected to the conveyor belts to stop at a predetermined position and initiate other actions that will be described.

Figure 5:
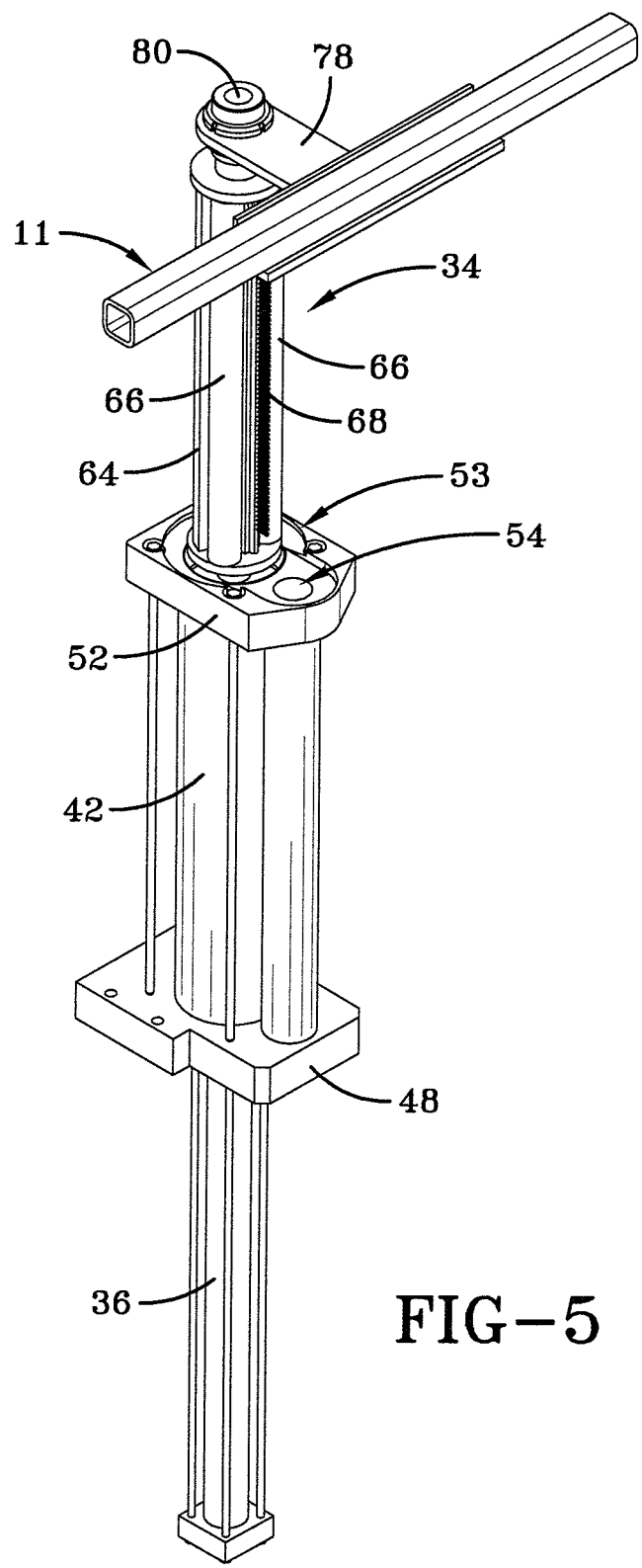
FIG. 5 is a partial front perspective view of the lubricating wick assembly in an extended position away from the lubricating wick chamber according to the concepts of the present invention.

A significant portion of the lubricating system 10 is substantially maintained underneath the conveyor belts, wherein the primary components of the system are associated in the area of the conveyor opening 20. The lubricating system 10 may include a lubricating wick chamber 32 which maintains therein a lubricating wick assembly 34. The lubricating wick assembly 34 is movable to an extended position, as shown in FIG. 5, and, as a result, axially movable into the tire bore 22 by a movement cylinder 36. The cylinder 36 internally maintains a piston rod 38, wherein the cylinder 36 is connected to the controller 26 and receives a control signal B from the controller 26 at an appropriate time to extend and retract the piston rod and, as a result, the wick assembly 34. Also part of the lubricating system 10 is a lubricating pump system 40 which supplies lubricating fluid to the lubricating wick assembly 34 as it either moves into or out of the chamber 32.

The lubricating wick chamber 32 is axially aligned with the conveyor opening 20 and, in particular, the tire bore 22 when the tire is in a stopped position on the conveyor belts 18. The chamber 32 includes a chamber housing 42 which defines a chamber cavity 44 which has a housing bottom 48 that seals the bottom of the housing 42. Connected to an opening in the housing bottom 48 is an excess return port 50 which collects any excess lubricating fluid that accumulates at the bottom of the chamber for return to the lubricating pump system 40 by a tube 51 connected to the port. A housing cap 52, which has a cap opening 53, is situated on the chamber housing 42 at an end opposite the housing bottom 48. The cap 52 effectively surrounds an upper edge of the chamber housing 42 and allows for extension and retraction of the lubricating wick assembly 34 through the cap opening 53. The cap 52, which may extend radially from the chamber housing 42, may provide for a drain 54 which collects any excess lubricating fluid that drops from the lubricating wick assembly 34 and directs it toward the housing bottom 48 for return by the excess return port 50 and tube 51 to the pump system 40. Excess fluid may also drain back into the chamber housing 42 through the port 50 and the tube 51.

The lubricating wick assembly 34 is axially movable out of and back into the chamber housing 42. Moreover, the lubricating wick assembly is movable into and out of the tire bore 22. Movement of the assembly 34 is initiated by the piston rod 38, wherein the cylinder 36 is positioned below the housing bottom 48 with an appropriate sealing arrangement maintained around the piston rod 38. This precludes any leakage of the lubricating fluid into the cylinder 36. At the appropriate time, the controller 26 generates the control signal B that is received by the cylinder 36 which controls vertical movement of the piston 38, which in turn vertically moves the lubricating wick assembly 34.

The lubricating wick assembly 34, which is best seen in FIGS. 4-7, includes a bottom cap 60 which is opposed by a top cap 62. The bottom cap 60 is connected to and moved by the piston rod 38. At least one support rod 64 may extend between the bottom cap 60 and top cap 62 for connection therebetween. Also connected between the bottom cap 60 and the top cap 62 is at least one engagement roller 66. In some embodiments a pair of engagement rollers 66 may be employed, wherein each roller is spaced equidistantly from the support rod. In some embodiments, the roller or rollers may extend only from just one of the caps. Moreover, each roller 66 is rotatable about its axis. In other words, any tangential force applied to the roller will cause it to rotate. Extending from at least one of the caps 60 and 62 is an elongate brush 68. The brush includes brush bristles 70 upon which lubricating fluid is applied and which is then later transferred to the tire beads as will be described. In one embodiment, the elongate brush may be connected to both caps 60 and 62.

The elongate brush 68 in some embodiments may be connected between the caps 60 and 62 and positioned between the rollers 66. Skilled artisans will appreciate that the brush 68 may be provided in a number of brush segments 72 that are fastened to a spine 73 so as to allow for replacement of selected brush segments if they become worn. The elongate brush is positioned so that the bristles extend radially further than an outer surface of the engagement rollers when not engaged by the tire beads. However, when the engagement roller or rollers come in contact with the tire beads, the brush bristles 70 are deflected and transfer lubricant to the bead as the tire and/or wick assembly is moved.

Figure 6:
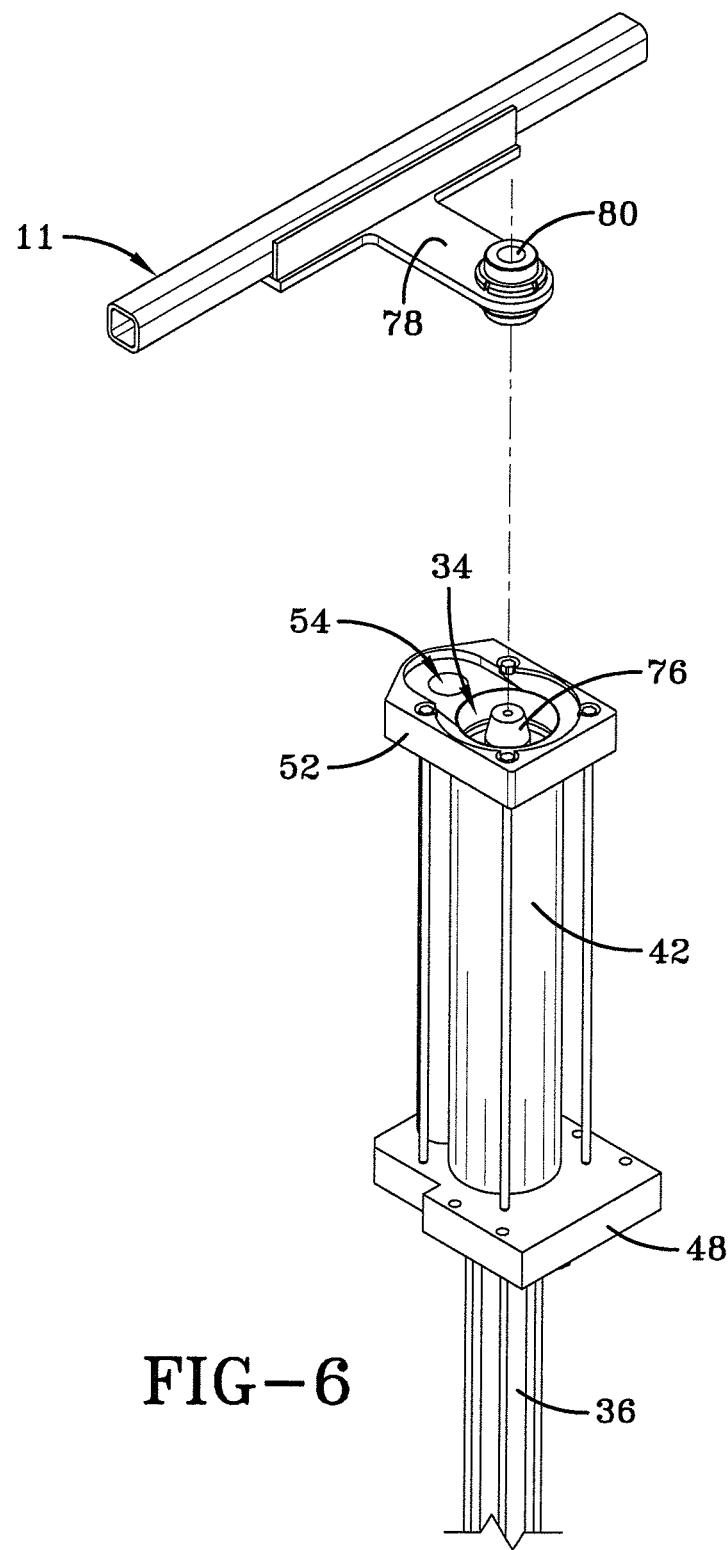
FIG. 6 is a partial rear perspective view of the lubricating wick assembly in a retracted position with respect to the lubricating wick chamber according to the concepts of the present invention.
Figure 7:
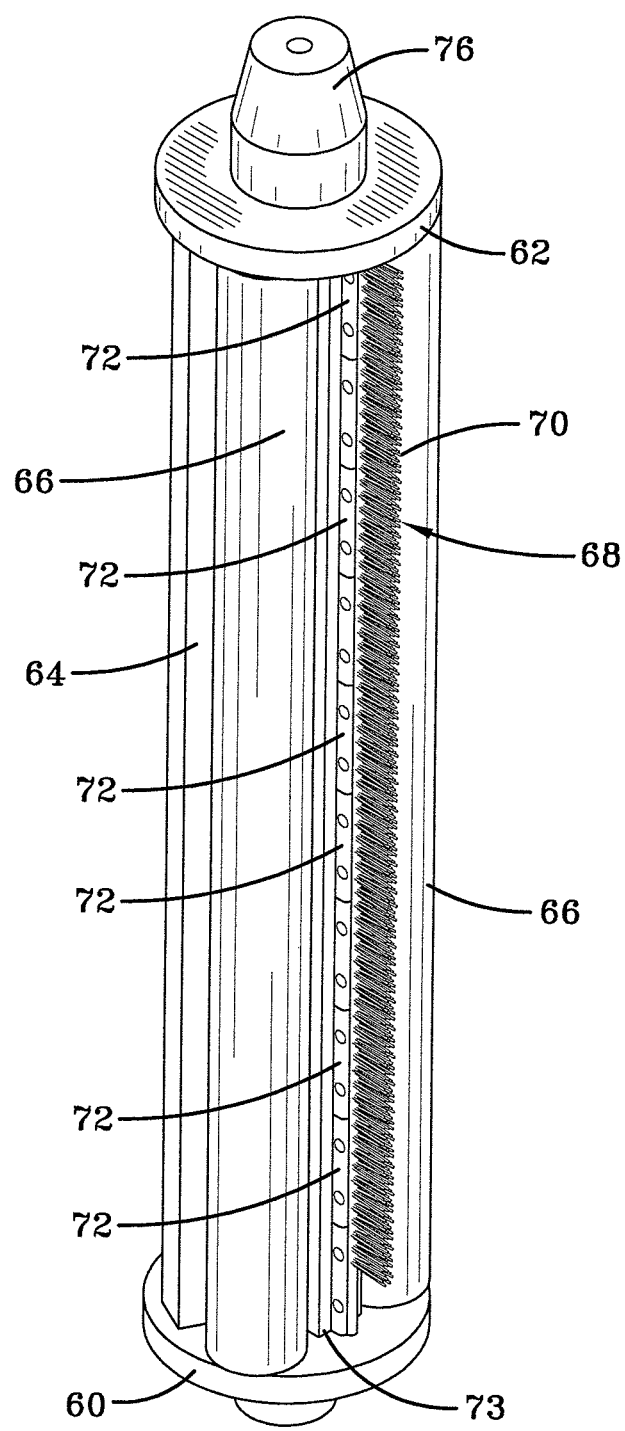
FIG. 7 is a perspective view of the lubricating wick assembly according to the concepts of the present invention.

As best seen in FIGS. 5 and 6, extending from the top cap 62 is a cap pilot 76 which may be somewhat conical in shape and is positioned on a side of the cap opposite the rollers and the brush. Extending from the frame 11, and above the conveyor belts 18, is an external cross member 78 which in the present embodiment extends vertically upwardly from the frame and then horizontally over the conveyor opening 20. In some embodiments, the external cross member 78 may extend from a structure other than the frame 11. The cross member 78 provides for a cross member receiver hole 80 which is axially aligned with the cap pilot 76 for receipt therein when the lubricating wick assembly 34 is vertically extended.

Referring back to FIGS. 1 and 2, it can be seen that the lubricating pump system 40 may be maintained on the floor underneath the frame 11 or in close proximity thereto. The pump system 40 includes a fluid tank 84 which holds the lubricating fluid, wherein the tank may carry a removable tank cover 86 for enclosure thereof. A pump 90 is maintained on the tank cover 86 and connected to the controller 26 via a control signal C. A cover 92 may be employed to cover the pump 90 so as to keep debris out of the pump mechanism. Maintained within the fluid tank 84 is a fluid level switch 94 which monitors the fluid level therein and sends a level indication via control signal C to the controller 26 so that alerts may be generated and/or sent depending upon the fluid level. A fill cap 100 is associated with the cover 86 to allow for depositing of lubricating fluid into the tank 84 as needed. The cover 86 also provides a fluid return port 102 which is connected to the excess return tube 51 so that any excess fluid that is collected may be recycled through the pump system 40. An air line 106 is connected to the pump to facilitate operation thereof and a fluid line 108 extends from the pump 90 wherein the opposite end of the fluid line 108 is connected to a spray nozzle 110 which is mounted to the lubricating wick chamber housing 42 at an optimal position. In other words, the spray nozzle 110 is directed so as to deposit lubricating fluid onto the brush bristles 70 as the lubricating wick assembly is extended upwardly and/or received during return into the chamber housing 42.

Figure 8:
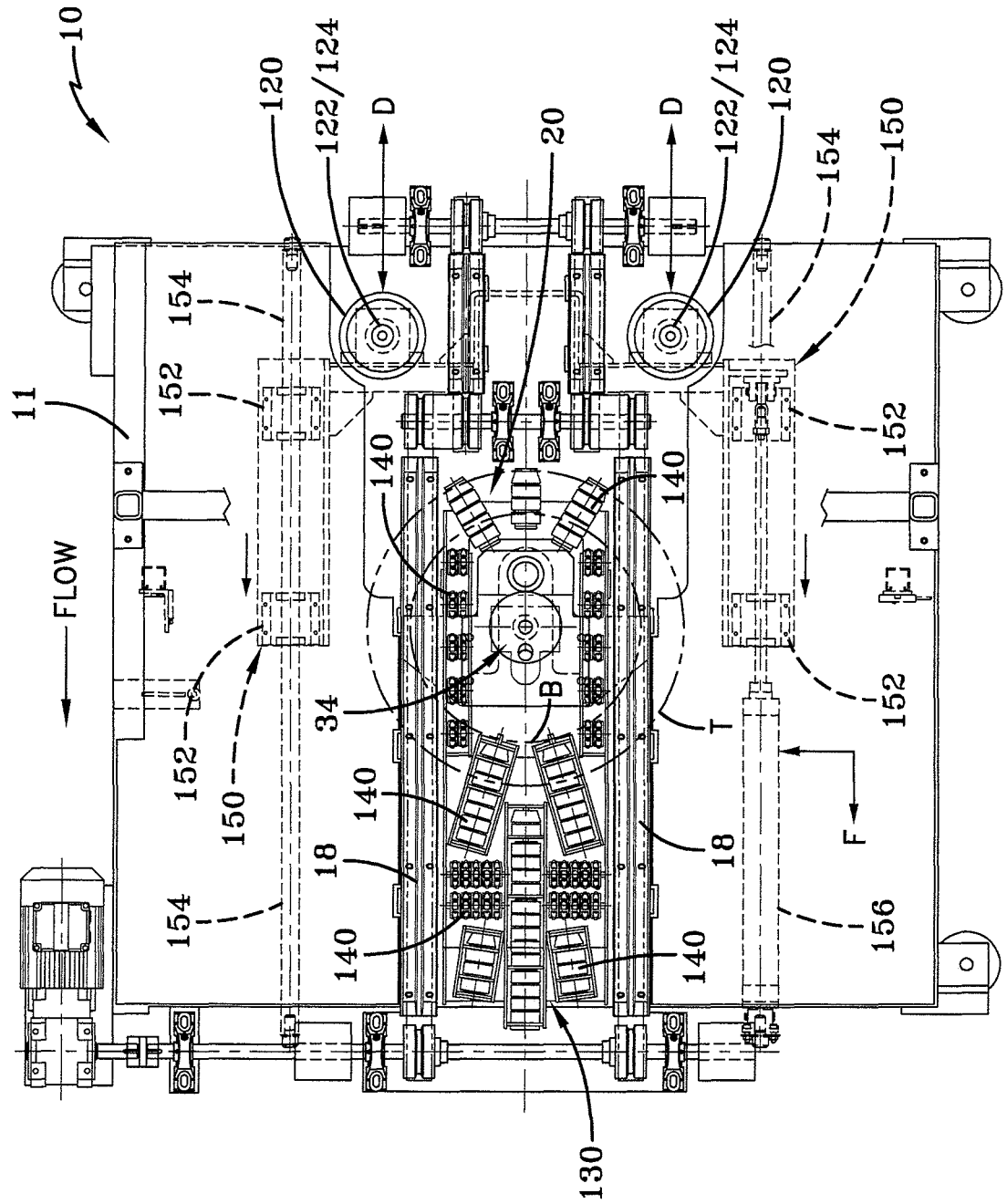
FIG. 8 is a top view of the tire bead lubricating system showing a tire to be lubricated prior to initiation of the lubrication operation according to the concepts of the present invention.
Figure 9:
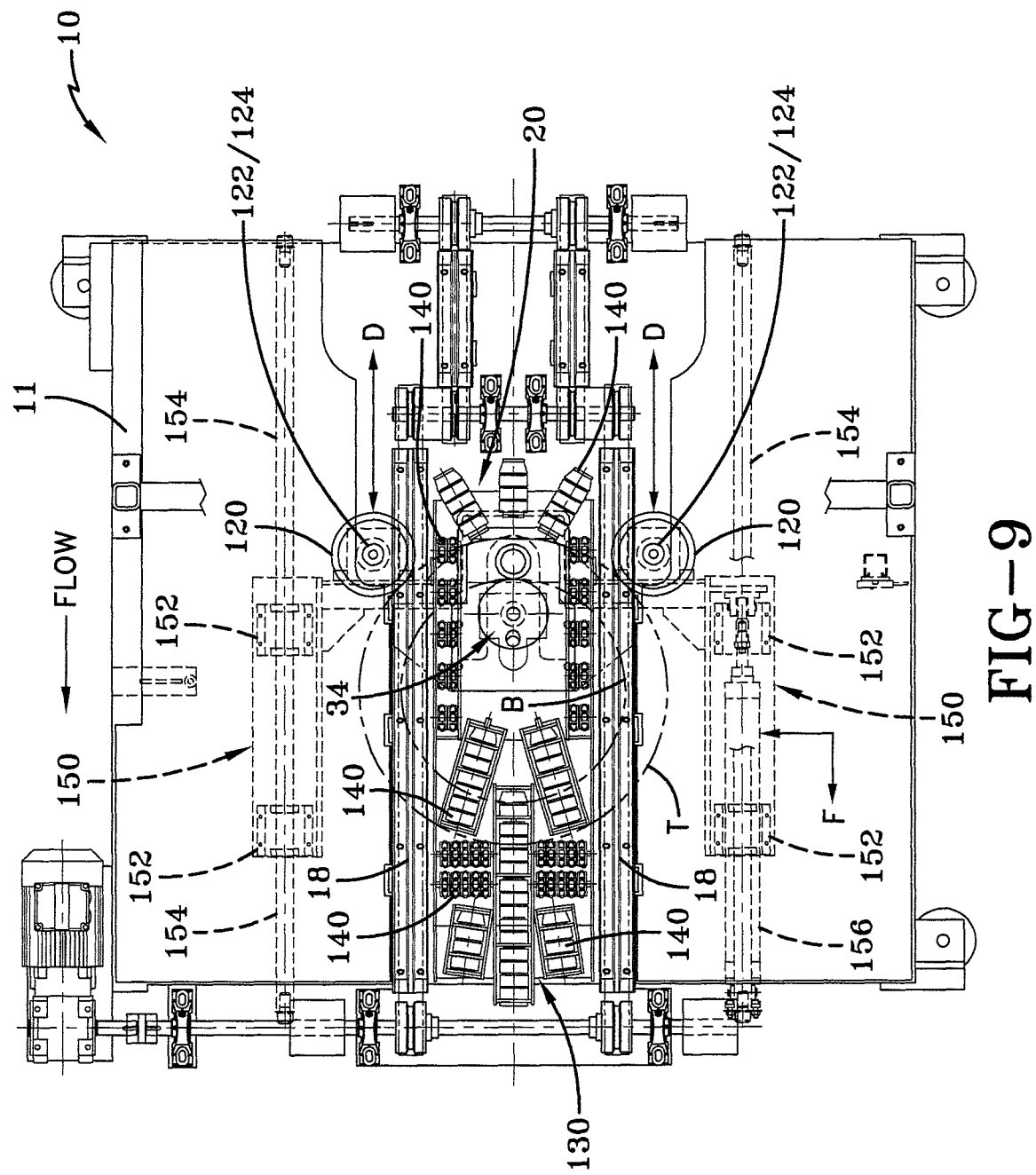
FIG. 9 is a top view of the tire bead lubricating system showing the lubricating wick assembly in an operating position prior to initiation of the lubrication operation according to the concepts of the present invention.

Implementation of the lubricating system 10 may require additional components. As seen in FIGS. 8 and 9, a spinner roll 120 may be positioned on each side of the frame 11 near the conveyor belts 18. Each spinner roll 120 includes a roll drive 122, which moves the spinner roll vertically above the conveyor belt when needed and retracted underneath the conveyor belts when not needed. Each spinner roll may also include a drive motor 124 which is connected to the controller and which serves to rotate the respective spinner roll 120. The roll drives 122 and the drive motors 124 are operated by the controller 26 via a control signal D.

Another feature of the lubricating system is a pop-up table 130 which is positioned between the conveyor belts 18 in the area of the conveyor opening 20. At least one table air cylinder 132 (best seen in FIG. 2) is coupled to the pop-up table 130 which lifts the tire off the conveyor belts 18 and allows rotation of the tire. The air cylinder 132 is connected to the controller 26 and mounted to an underside of the frame and/or to components of the tire bead lubricating system. Each air cylinder 132 receives a control signal E from the controller 26. The pop-up table 130 includes a plurality of table rollers 140 which allow for rotatable movement of the tire as will be explained.

The spinner rolls 120, once lifted into a position above the conveyor belts, and after the tire is lifted by the pop-up table 130, are moved laterally by a carriage 150. The carriage 150 includes a pair of bushings 152 slidably mounted on rods 154 that are carried by the frame 11. A piston 156, which may be connected to the controller 26 by control signal F, places the spinner rolls 120 into engagement with the tread of the tire. As discussed below, this places the tire beads adjacent to or in contacting engagement with the rollers 66.

In operation, the tire is delivered along a conveyor line and received by the conveyor belts 18. The tire position sensor 24 detects the leading edge of the tire and positions the tire so that its bore 22 is substantially concentric with the lubricating wick chamber 32. At the appropriate time, the controller 26 causes the conveyor belts 18 to stop movement and the tire is positioned in place. Next, the pop-up table 130 is actuated so that the table rollers 140 engage the tire sidewall and lift the tire above the conveyor belts so that the tire is no longer in contact therewith.

Upon completion of those steps, the controller instructs the lubricating wick cylinder 36 to actuate its internal piston rod 38 so as to vertically move the lubricating wick assembly 34 out of the lubricating wick chamber 32. Concurrently with this instruction the controller may instruct the pump system 40 to direct lubricating fluid through to the spray nozzle 110 which deposits the lubricating fluid on to the brush bristles 70 as they move upwardly. The lubricating wick assembly may continue to move upwardly until such time that the cap pilot 76 is received in the cross member receiver hole 80. Next, the controller 26 instructs the roll drives 122 to extend upwardly and lift the spinner rolls up whereupon the controller 26 actuates the piston 156 which moves the carriage 150 causing the spin rollers 120 to laterally engage the tire tread. This lateral movement forces the tire beads into engagement with the rollers 66. Next, the controller instructs the spinner rolls to rotate which results in rotation of the tire. Rotation of the tire forces the beads of the tire to rotatably engage the engagement rollers and the brush bristles to apply lubricating fluid to the tire beads as the tire is rotated on the table rollers 140. After a sufficient number of rotations of the tire have been completed so as to coat both beads with the appropriate amount of lubricant, rotation of the spinner rolls is stopped by the controller 26 and withdrawn. In a corresponding manner, the lubricating wick assembly may be withdrawn, the spin rollers disengaged and lowered, and the pop-up table is lowered so that the tire sidewalls are no longer engaged by the pop-up table 130 but by the conveyor belts 18. Once all of the assemblies are fully withdrawn, then the conveyor belts deliver the lubricated tire to the chucking station.

The advantages of the present invention are readily apparent. The use of a brush with lubricating fluid deposited thereon is advantageous in that the brush does not absorb the direct contact of the tire bead. Instead, the rollers absorb the direct contact and minimal forces are applied to the brush bristles so that they do no become excessively worn and fall into the flow of the lubricating fluid. As a result, the bristles do not foul the pump machinery nor do loose or detached bristles enter into other fluid systems of nearby operating equipment. Additionally, more fluid is recycled, thus minimizing waste. Finally, worn brush segments can be easily replaced as needed.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:
1. A tire bead lubricating system for applying lubricant to beads of a tire, comprising:
   a frame;
   a pair of conveyor belts associated with said frame for transferring a tire, said pair of conveyor belts having a conveyor opening therebetween;

a pop-up table having a plurality of table rollers positioned between said pair of conveyor belts and aligned with said conveyor opening to receive and elevate the tire;

a movement cylinder associated with said frame;

a spray nozzle that dispenses lubricant, said spray nozzle associated with said frame;

a lubricating wick assembly axially movable by said movement cylinder into a bore of the tire, said lubricating wick assembly having opposed caps connected to one another by at least one engagement roller and wherein at least one elongate brush extends from at least one of said caps, said spray nozzle dispensing lubricant on to said at least one elongate brush; and at least one spin roll adapted to engage and rotate the tire on said plurality of table rollers elevated by said pop-up table when said lubricating wick assembly is moved by said movement cylinder into the bore so that said at least one engagement roller and said at least one elongate brush contacts the tire beads and said at least one elongate brush applies lubricant to the tire beads.

2. The system according to claim 1, wherein said at least one engagement roller comprises a pair of engagement rollers extending between said caps, each said engagement roller axially rotatable, and wherein said at least one elongate brush extends between said opposed caps and is positioned in between said pair of engagement rollers.

3. The system according to claim 2, wherein said at least one elongate brush has a plurality of bristles that extend radially further than said pair of engagement rollers.

4. The system according to claim 2, wherein said at least one elongate brush comprises a plurality of brush segments, each said brush segment having a plurality of bristles, and wherein each said brush segment is replaceable.

5. The system according to claim 2, further comprising a lubricating wick chamber which axially receives said lubricating wick assembly.

6. The system according to claim 5, wherein said spray nozzle is coupled to said lubricating wick chamber, wherein said spray nozzle applies lubricating fluid to said at least one elongate brush when moving into or out of said lubricating wick chamber.

7. A tire bead lubricating system for applying lubricant to a tire, comprising:

a frame supporting conveyor belts which form a conveyor opening therebetween, wherein the conveyor belts transfer a tire from one end of the frame to another;

a pop-up table having a plurality of table rollers positioned between said conveyor belts and aligned with said conveyor opening to receive and elevate the tire;

a lubricating wick chamber maintained within said frame and positioned underneath said conveyor opening;

a movement cylinder supporting said lubricating wick chamber and having a movable piston rod;

a spray nozzle that dispenses lubricant and is associated with said lubricating wick chamber;

a lubricating wick assembly received in said lubricating wick chamber and adapted to move into said conveyor opening by actuation of said movable piston rod, said lubricating wick assembly having at least one engagement roller and at least one elongate brush that carries lubricant applied by said spray nozzle; and at least one spin roll adapted to engage and rotate the tire on said plurality of table rollers when elevated by said pop-up table when said lubricating wick assembly is moved by said movable piston so that said at least one engagement roller and said at least one elongate brush contacts the tire.

8. The system according to claim 7, wherein said at least one elongate brush has a plurality of bristles that extend radially further than said at least one engagement roller.

9. The system according to claim 7, wherein said at least one engagement roller extends between a pair of opposed caps and said at least one elongate brush comprises a pair of engagement rollers extending from at least one of said caps and is positioned in between said pair of engagement rollers.

10. The system according to claim 9, further comprising:

a lubricating pump system having a tank for holding lubricating fluid and a pump connected to said spray nozzle associated with said lubricating wick assembly, wherein said pump directs lubricating fluid through said spray nozzle on to said at least one elongate brush.

11. The system according to claim 10, wherein said pump sprays lubricating fluid when said lubricating wick assembly moves out of or into said lubricating wick chamber.

12. The system according to claim 11, wherein an excess return tube connected to said lubricating wick chamber delivers lubricating fluid to said tank.

13. The system according to claim 11, wherein said lubricating wick assembly has said pair of opposed caps and said pair of said engagement rollers extending therebetween, wherein each of said rollers is rotatable.

14. The system according to claim 9, further comprising an external cross member extending from said frame, said external cross member having a receiver hole, said lubricating wick assembly having a cap pilot extending from one of said caps and receivable in said receiver hole when said lubricating wick assembly extends from said lubricating wick chamber.

* * * * *